United States Patent [19]
Yoon et al.

[11] Patent Number: 6,163,847
[45] Date of Patent: Dec. 19, 2000

[54] COMPUTER WITH AUTOMATIC POWER CUT-OFF FUNCTION AND CONTROL METHOD THEREFOR

[75] Inventors: Ji-Seob Yoon; Kyung-Sang Lee, both of Suwon; Hyun-Chul Kim, Seoul; Seung-Ju Na, Suwon, all of Rep. of Korea

[73] Assignee: SamSung Electronics, Ltd., Suwon, Rep. of Korea

[21] Appl. No.: 09/045,645

[22] Filed: Mar. 23, 1998

[30] Foreign Application Priority Data

Mar. 21, 1997 [KR] Rep. of Korea ............. 97-09703

[51] Int. Cl.$^7$ ............................................. G06F 1/32
[52] U.S. Cl. ..................................................... 713/320
[58] Field of Search ................................. 713/300, 320, 713/322, 324, 330, 340; 714/24

[56] References Cited

U.S. PATENT DOCUMENTS

| | | | |
|---|---|---|---|
| 5,056,092 | 10/1991 | Bruner | 714/24 |
| 5,369,771 | 11/1994 | Gettel | 713/322 |
| 5,548,763 | 8/1996 | Combs et al. | 713/323 |
| 5,560,023 | 9/1996 | Crump et al. | 713/320 |
| 5,638,541 | 6/1997 | Sadashivaiah | 713/320 |
| 5,680,540 | 10/1997 | Pearce | 714/24 |
| 5,784,628 | 7/1998 | Reneris | 713/300 |
| 5,845,138 | 12/1998 | Nowlin, Jr. | 713/323 |
| 5,978,922 | 11/1999 | Arai et al. | 713/323 |

*Primary Examiner*—Glenn A. Auve
*Attorney, Agent, or Firm*—Robert E. Bushnell, Esq.; Robert E. Bushnell

[57] ABSTRACT

A computer with automatic power cut-off function comprises a BIOS portion including a system power cut-off service routine for generating the power cut-off command to write it; a microprocessor including an advanced power management portion for generating the power cut-off control signal; and a power control portion for cutting the power source to the system based on the power cut-off control signal, thereby performing the power cut-off by itself without a waiting time taken in storing data and information at a system memory during the power cutting off of the operating system.

16 Claims, 9 Drawing Sheets

ND CONTROL
COMPUTER WITH AUTOMATIC POWER CUT-OFF FUNCTION AND CONTROL METHOD THEREFOR

CROSS-REFERENCE TO RELATED APPLICATION

This application makes reference to, incorporates the same herein, and claims all rights accruing thereto under 35 U.S.C. §121 through my patent application entitled Computer With Automatic Power Cut-Off Function And Control Method Therefor earlier filed in the Korean Industrial Property Office on the $21^{ST}$ day of March 1997 and there duly assigned Ser. No. 97-9703.

FIELD OF THE INVENTION

The invention is related to power control of a computer system, and particularly, to providing a computer with an automatic power cut-off function and a control method therefor for automatically cutting the power supply to a system.

BACKGROUND OF THE INVENTION

A typical computer is supposed to operate according to a predetermined operating system. The operating system controls the starting and stopping of the computer. Especially, the stopping operation occurs upon the power being cut-off. In that case, the system stopping command of the operating system is used to force the computer to store program information and data, as described for example in computer operating systems utilizing an APM (advanced power management) function is on an increasing trend. See, for example, U.S. Pat. No. 5,638,541 for System And Method For Managing Power On Desktop System issued to Shivaprasad Sadashivaiah and U.S. Pat. No. 5,560,023 for Automatic Backup System For Advance Power Management issued to Dwayne T. Crump et al.

Some operating systems then display a final message, indicating that the user can now turn off power to the system, on a monitor for a user to read. The computer is determined to store information and data of a user's job in a predetermined period time prior to displaying the final message. This means the user must wait for a time before shutting off the power. Accordingly, the user is inconvenienced by this waiting time.

SUMMARY OF THE INVENTION

An object of invention is to provide a computer with an automatic power cut-off function and a control method therefor for cutting the power source to a system in itself.

The other object of the invention is to provide a computer with an automatic power cut-off function and a control method therefor for enabling a microprocessor to cut the power source to a system, automatically, using an advanced power management.

Another object of the invention is to provide a computer comprising a BIOS provided with a power cut-off service portion for enabling a microprocessor to cut the power source to a system, automatically, using an advanced power management and for enabling a microprocessor to cut the power source to a system, automatically, and a control method therefor.

According to one embodiment of the invention, a computer with automatic power cut-off function comprises a BIOS portion for storing a program to control various inputs and outputs of the system; a CPU for performing the data processing function; a power control portion for controlling the power supply and cut-off of a power source to the system; and a microprocessor for enabling the power control portion to generate the power cut-off signal, cut the power source to the system and perform a predetermined programming mode, when a software of the computer is ended, thereby improving the performance of an operating system and confirming the connection of a power adaptor and the power cut-off by itself.

A control method of the computer with automatic power cut-off function comprises steps of ending the operating system of a system, generating a power cut-off control signal to cut the power source to the system, automatically; and outputting the power cut-off control signal to cut the power source to the system, thereby improving the performance of an operating system and confirming the connection of a power adaptor and the power cut-off by itself.

According to the other embodiment of the invention, a computer with automatic power cut-off function comprises a BIOS portion for storing a program to control various inputs and outputs of a system; a CPU for performing the data processing function; a power control portion for controlling the power supply and cut-off to the system; a microprocessor including an advanced power management portion for enabling the power control portion to generate the power cut-off signal, cut the power source to the system and perform a predetermined ending mode, thereby improving the performance of an operating system and confirming the connection of a power adaptor and the power cut-off by itself.

A control method of the computer with automatic power cut-off function comprises steps of ending the operating system of a system, generating a power cut-off control signal based on an advanced power management to cut the power source to the system, automatically; and outputting the power cut-off control signal to cut the power source to the system, thereby improving the performance of an operating system and confirming the connection of a power adaptor and the power cut-off by itself.

According to another embodiment of the invention, a computer with automatic power cut-off function comprises a BIOS portion including a system power cut-off service routine for generating the power cut-off command to write it; a microprocessor including an advanced power management portion for generating the power cut-off control signal; and a power control portion for cutting the power source to the system based on the power cut-off control signal and performing a predetermined mode, thereby performing the power cut-off function by itself without the waiting time taken in storing data and various information of a system at a predetermined memory.

A control method of the computer with automatic power cut-off function comprises steps of calling a system power cut-off service routine from a BIOS portion using an advanced power management function of a microprocessor upon the system ending; determining whether the microprocessor is ready to perform the power cut-off command; enabling the BIOS portion to write the power cut-off command in the microprocessor, if the microprocessor is ready; forcing the BIOS portion to be halted during the power cut-off command performing of the microprocessor; and enabling the microprocessor to cut the system power, thereby performing the power cut-off function by itself without the waiting time taken in storing data and various information of a system at a predetermined memory.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
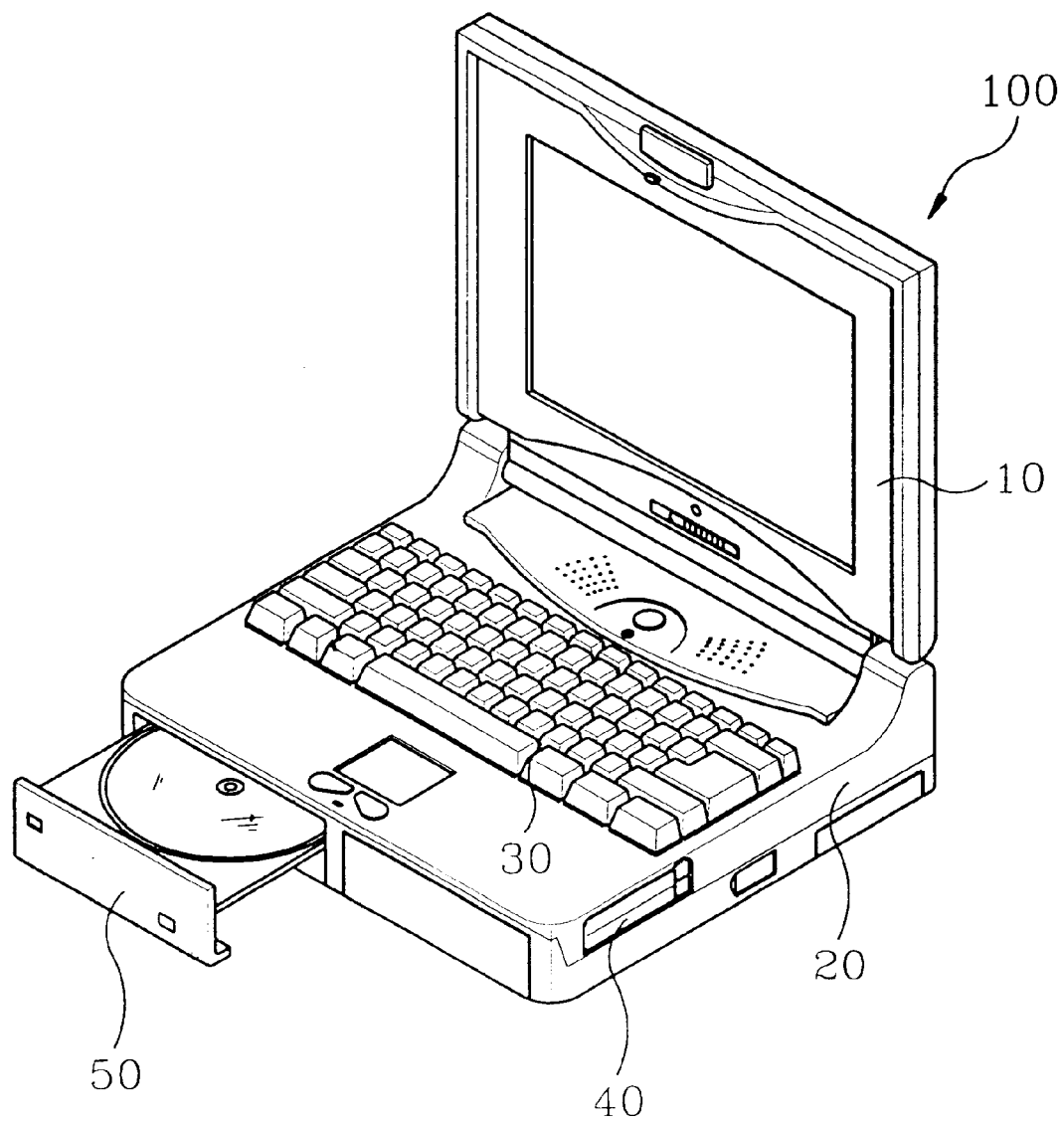
FIG. 1 is a view illustrating a notebook computer.

Referring to FIG. 1, a notebook computer 100 is shown in appearance. The computer is provided with a monitor 10 including a liquid crystal display panel, a main body 20, a keyboard 30, a floppy disk drive 40 and a compact disc-read only memory (CD-ROM) drive 50. The notebook computer is operated under a known operating system. The operating system stops the operation of the notebook computer as explained below with respect to FIGS. 2A–2C.

Figure 2A:
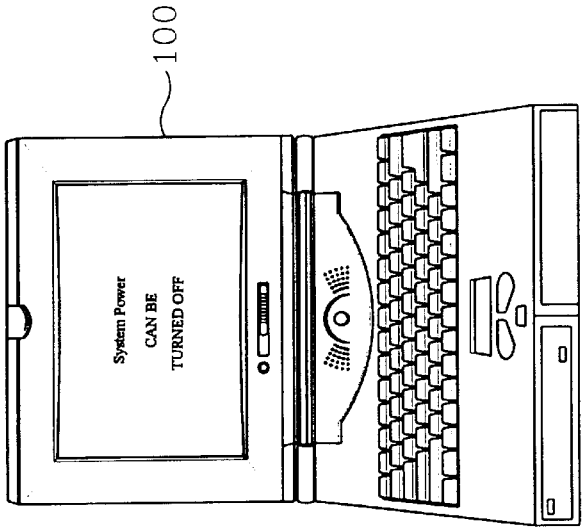
FIGS. 2A, 2B and 2C are views illustrating hypothetically displayed messages generated by an operating system prior to power shut off.
Figure 2B:
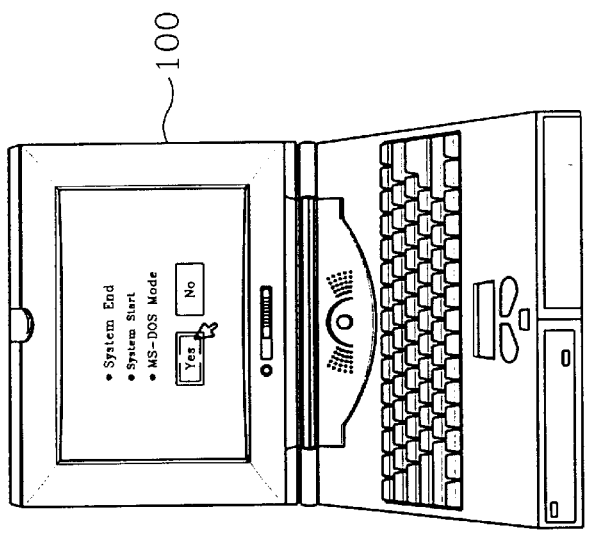
Figure 2C:
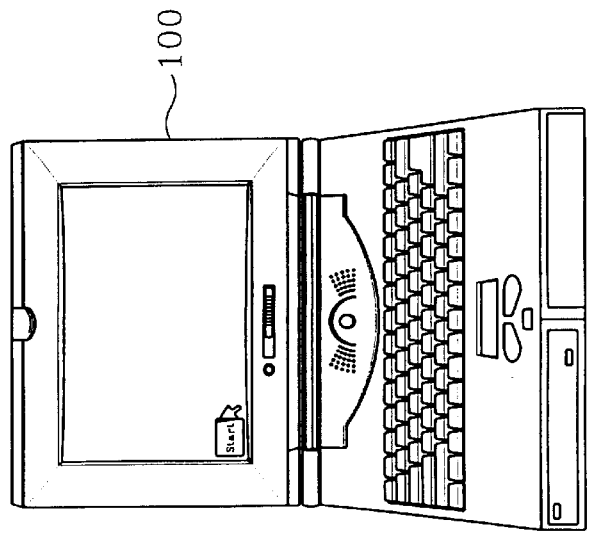

Referring to FIG. 2A, when the end of system operation is intended, a user clicks a mouse button when a mouse pointer is positioned over a START button displayed on the screen of the liquid crystal display panel. A sub-menu is then displayed comprising selectable commands such as SYSTEM END, SYSTEM RESTART, and MS-DOS MODE, and the user then selects SYSTEM END and clicks on the YES confirmation button as shown in FIG. 2B, in order to prepare the computer for turn off. At that time, if the confirmation of the system end is established, the message SYSTEM POWER CAN BE TURNED OFF is displayed on the screen indicated that the user can now toggle a power switch off, as shown in FIG. 2C.

Figure 3:
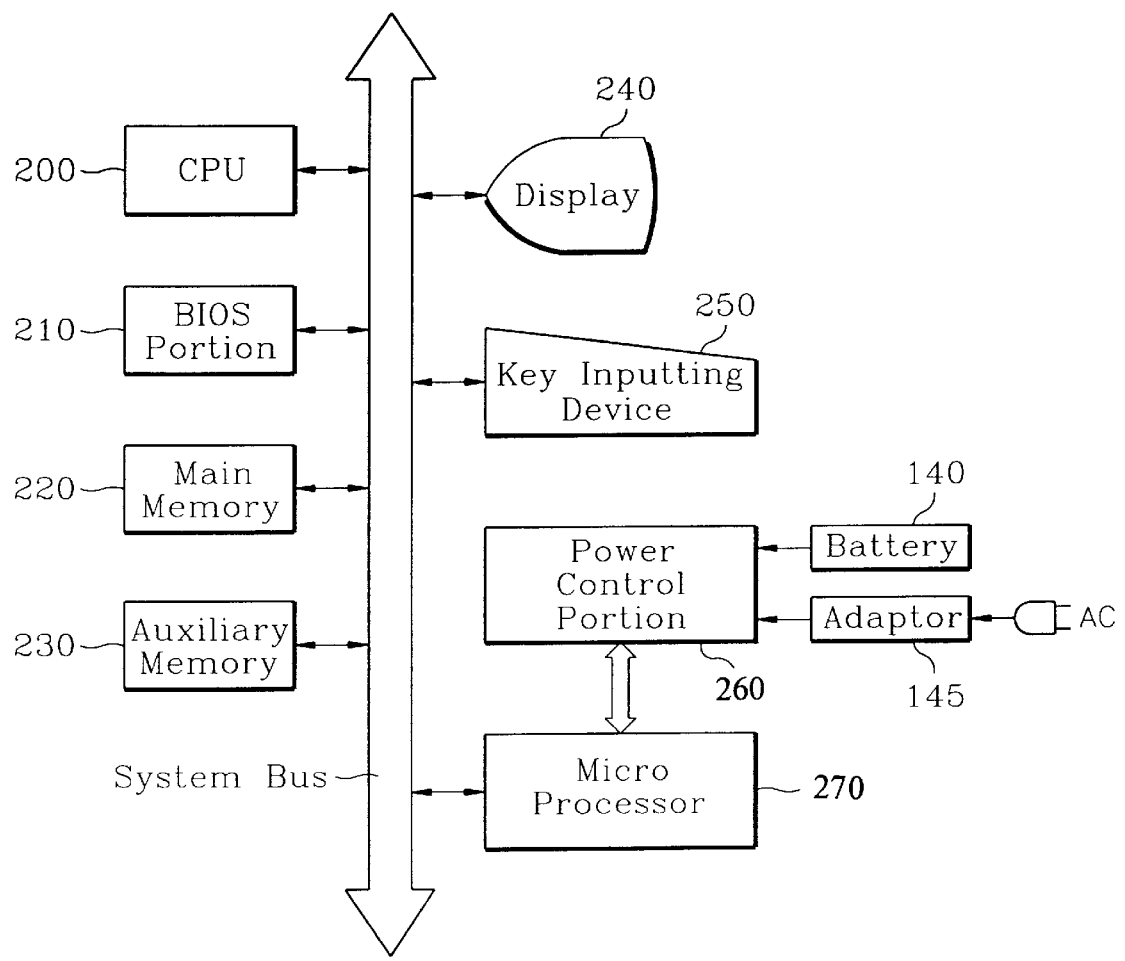
FIG. 3 is a view illustrating the configuration of a computer having an automatic power cut-off function according to one embodiment of the invention.

Referring to FIG. 3, a computer with an automatic power cut-off function comprises a BIOS portion 210, a central processing unit (CPU) 200, a microprocessor 270 and a power control portion 260 to remove a waiting time which the operating system takes for permitting the user to perform power cut-off and instead, performs the power cut-off by itself.

CPU 200 performs the operation control function of a computer according to a system program. A main memory 220 includes a random access memory (RAM) to store processed data, temporally. An auxiliary memory 230 includes a hard disk drive or a CD-ROM drive to store a system program, data and other programs. A key inputting device 250 includes a keyboard to input system commands, data and information. A display 240 includes a video card and a monitor to display the operation and processing states of the computer. BIOS portion 210 stores programs for various inputting and outputting operations of the computer and a processing program to perform an intended object of the system. A power control portion 260 cuts the power supply from a battery 280 or an adapter 290 to the system according to the control of microprocessor 270 as described below in detailed.

Figure 4:
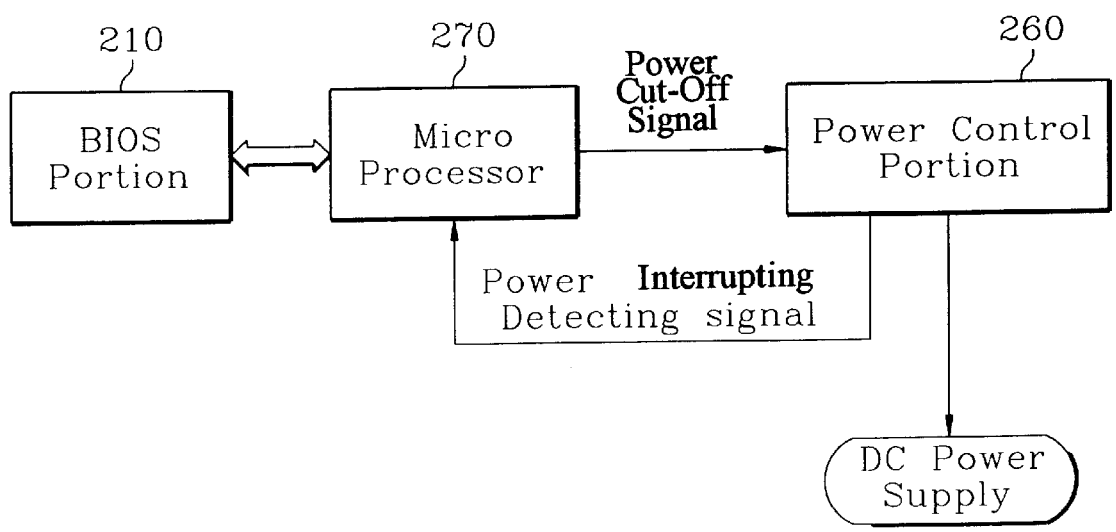
FIG. 4 is a view illustrating a flow chart of the power cut-off operation according to a power cut-off service routine stored at a BIOS portion.

Referring to FIG. 4, according to a power cut-off service routine stored in the BIOS portion 210 the power cut-off operation will be described. The end of system operation is accomplished by selecting the SYSTEM END command as shown in FIG. 2B. The operating system performs the power cut-off command based on an advanced management function (APM). As the command SYSTEM END is selected, CPU 200 fetches the power cut-off routine from BIOS portion 210 to perform the power cut-off command. CPU 200 forces the BIOS portion 210 to apply a power cut-off command control signal to microprocessor 270. Microprocessor 270 detects the control signal and applies a power cut-off signal to power control portion 260. Power control portion 260 cuts the direct current (DC) power supply, received from battery 280 or adaptor 290 as shown in FIG. 3, to all power inputting ports of the system. Then, microprocessor 270 checks for a power interrupting detecting signal to determine whether the system power is cut off. If the system power is not cut off, the microprocessor again controls power control portion 260 to cut the power supply to the system.

Figure 5:
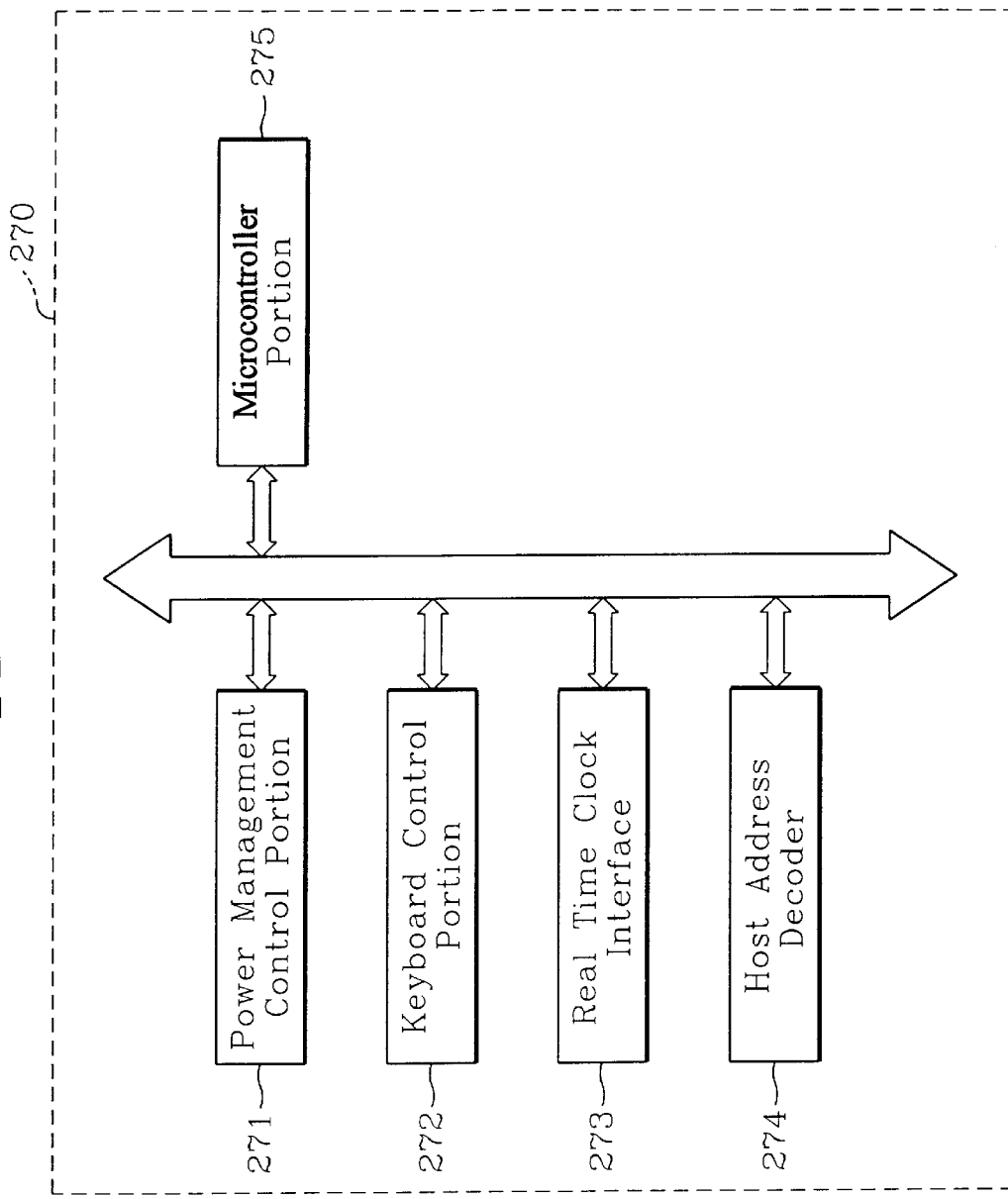
FIG. 5 is a view illustrating the function blocks of a microprocessor constructed according to the invention.
Figure 6:
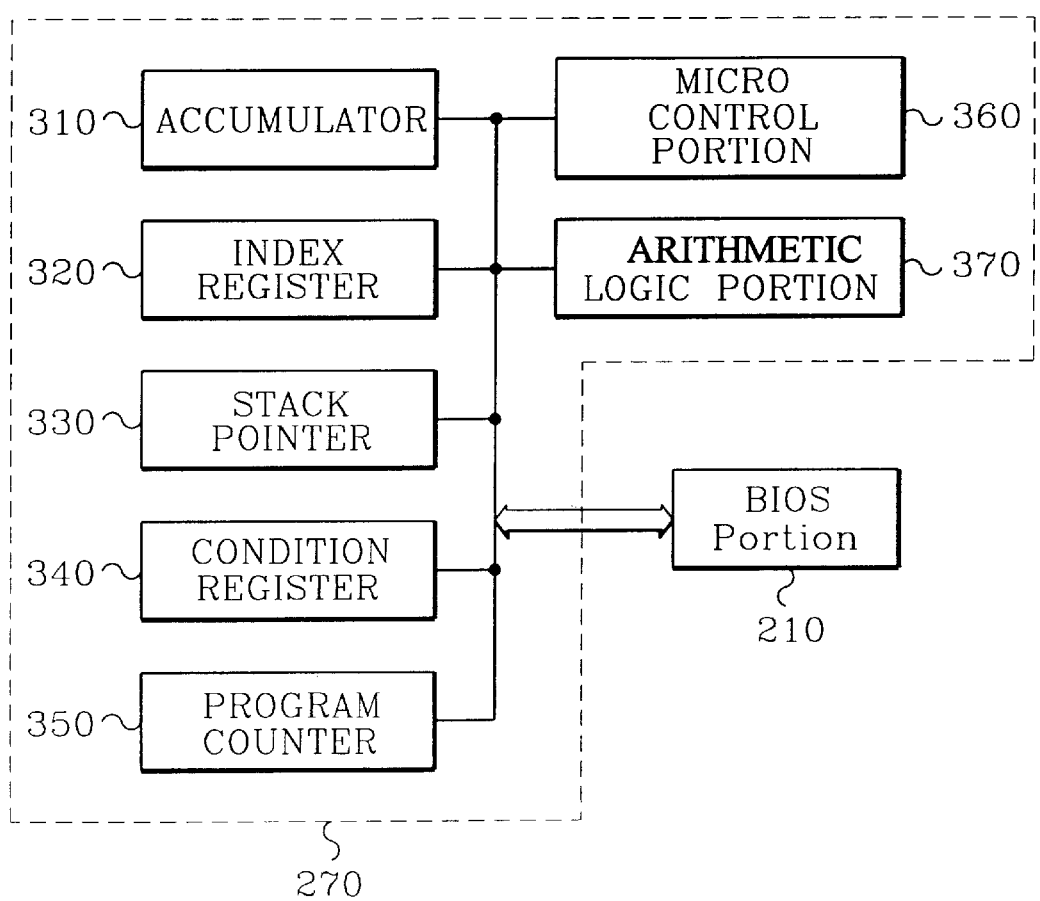
FIG. 6 is a view illustrating the hardware blocks of the microprocessor constructed according to the invention.

Referring to FIGS. 5 and 6, the function and configuration of microprocessor 270 are shown in detail. Microprocessor 270 performs an advanced power management function corresponding to a power management controller 271, a keyboard controller 272, a real time clock interface 273, a host address decoder 274 and a microcontroller portion 275, which are represented as a functional block, as shown in FIG. 5. Also, as shown in FIG. 6, microprocessor 270 comprises an accumulator 310, an index register 320, a stack pointer 330, a condition code register 340, a program counter 350, a micro control portion 360 and an arithmetic logic unit 370 in order to perform the advanced power management function. Therefore, CPU 200 calls a system power cut-off service routine from a BIOS portion using an advanced power management function of microprocessor 270 upon ending system operations. CPU 200 determines whether microprocessor 270 is ready to perform the power cut-off command. CPU 200 forces the BIOS portion 210 to write the power cut-off command in microprocessor 270, when the microprocessor 270 is ready. Microprocessor 270 forces the BIOS portion to be halted during the power cut-off command operation. Power control portion 260 cuts the power source to the system. Herein, microprocessor 270 can be commercially obtained as model name CPU 6805, well-known in this field. The detailed description of its configuration and functional application programs is well-known and thus not further described herein.

Figure 7:
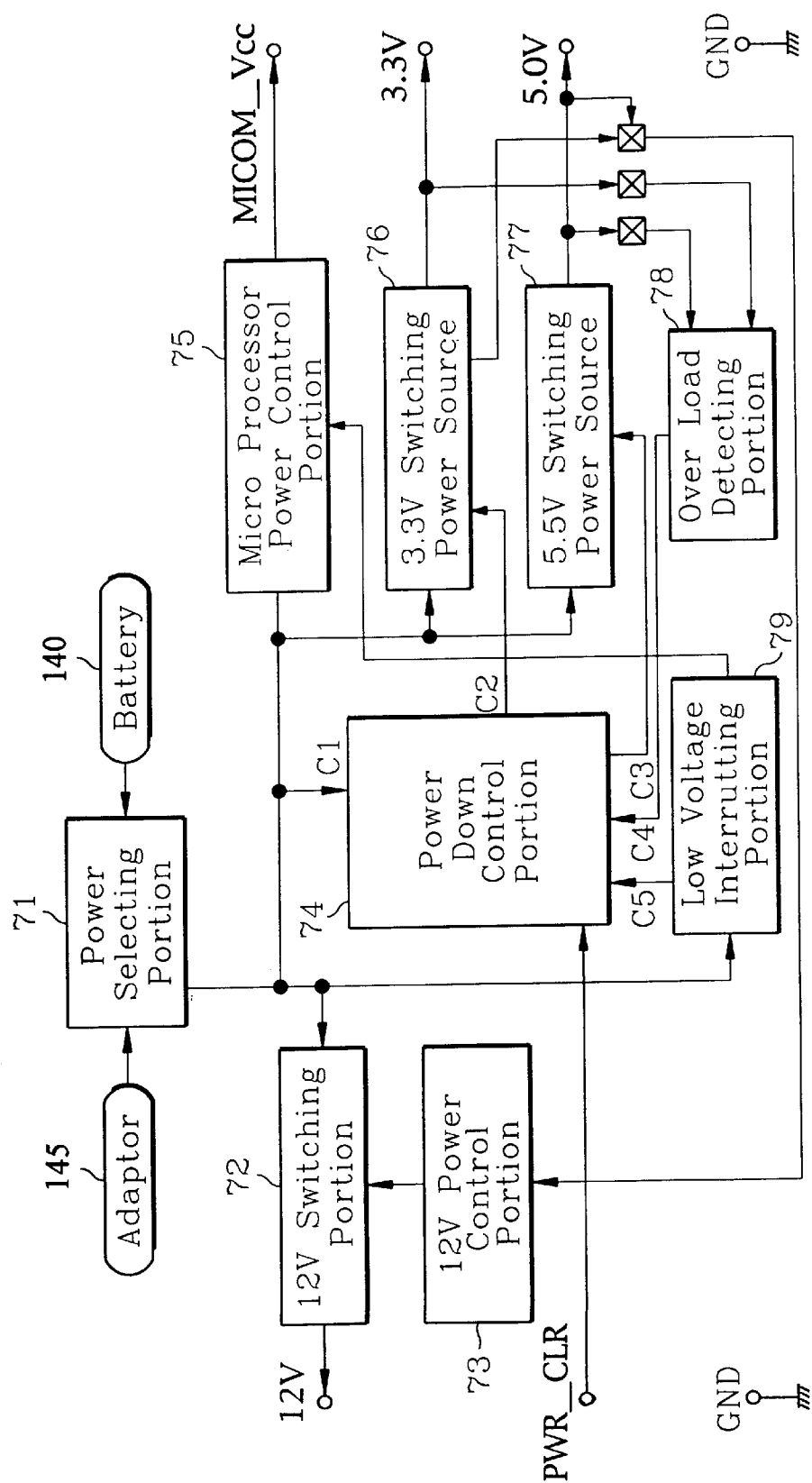
FIG. 7 is a detailed view illustrating a power control portion of the computer constructed according to the invention.

Referring to FIG. 7, the power control portion 260 is shown in detail. The power control portion 260 comprises a power selecting portion 71, a 12V switching portion 72, a 12V power control portion 73, a power down control portion 74 having a control port PWR-CLR, a microprocessor power control portion 75, a 3.3V switching power source 76, a 5V switching power source 77, an overload detecting portion 78 and a low voltage interrupting portion 79.

The power selecting portion 71 selects a power voltage from the adaptor 145 or the battery 140. According to the selection of a voltage, the 3.3V switching power source 76 and the 5V switching power source 77 each respectively outputs 3.3 V and 5 V to corresponding system loads. And, the 12V switching portion 72 is enabled by means of the 12V power control portion 73 to apply a 12 voltage to corresponding system loads. The microprocessor power control portion 75 supplies the power voltage MICOM_Vcc to microprocessor 270. The low voltage interrupting portion 79 applies a control signal, via control port C5, to the power down control portion 74 to interrupt the voltage supply to system loads, when the voltage selected by the power selecting portion 71 is below a predetermined power level. The overload detecting portion 78 determines whether the power sources of the 3.3V switching power source 76 and the 5V switching power source 77 are in an overload state. If the power sources become overloaded, the overload interrupting portion 79 applies a power cut-off control signal to a control port C4 of the power down control portion 74. At that time, the power down control portion 74 controls the 3.3V switching power source 76 and the 5V switching power source 77, via control ports C2 and C3, respectively, to cut the power supply to system loads.

In a normal operation mode, when the power down control portion 74 receives a control signal of a high logic level through the control port PWR-CLR, the power control portion 74 controls the 3.3V switching power source 76 and the 5V switching power source 77, via control ports C2 and C3, respectively.

According to the principal of the invention, when the power down control portion 74 receives a control signal of a low logic level through the control port PWR-CLR from microprocessor 270 due to the power cut-off mode, the power control portion 74 controls the 3.3V switching power source 76 and the 5V switching power source 77, via control ports C2 and C3, respectively, to deplete or cut the power source to the system. Therefore, all power sources 3.3V, 5.0V and 12V supplied to the system are interrupted. But, even though the power sources are turned off, a power source MICOM_Vcc is supplied by means of the microprocessor power control portion 75 to microprocessor 270 in order to permit microprocessor 270 to perform the predetermined modes of memorizing data and system programs storing.

Figure 8:
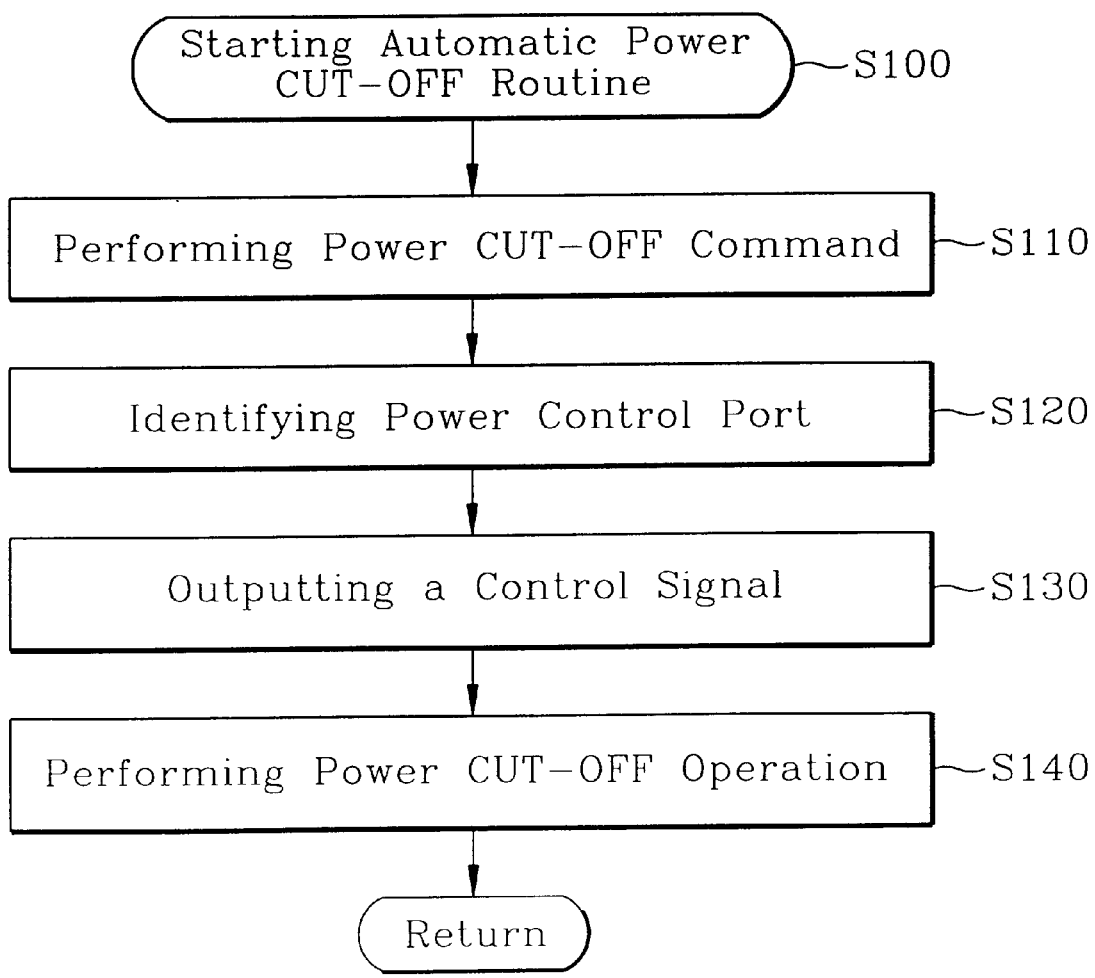
FIG. 8 is a flow chart illustrating a method of the automatic power cutting off according to the other embodiment of the invention.
Figure 9:
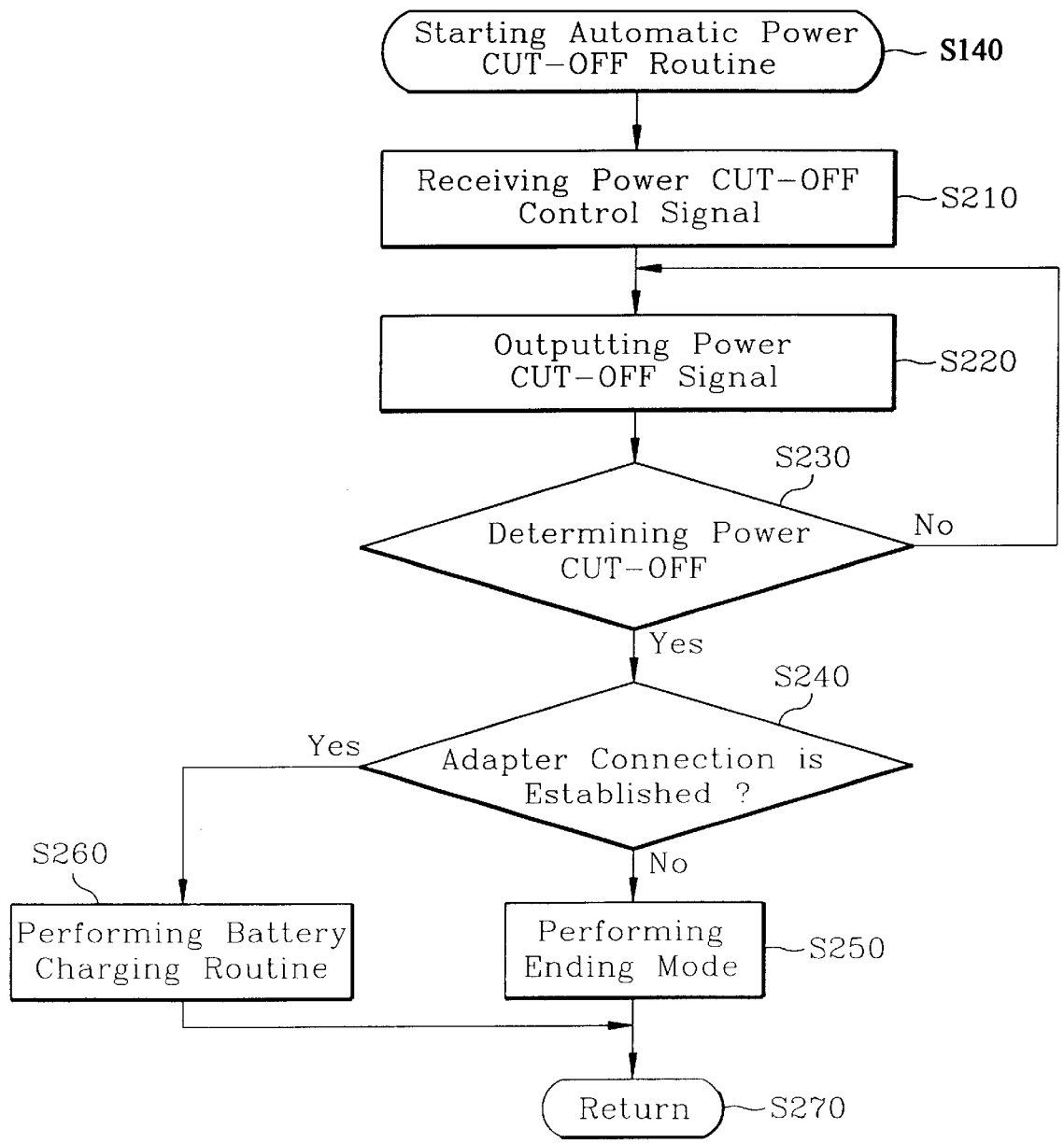
FIG. 9 is a detailed flow chart illustrating the power cut-off service routine of FIG. 7.

An automatic power cut-off method is illustrated in detail in FIGS. 8 and 9. The automatic power cut-off method S100 comprises a power cut-off command discriminating step S110, a power control port identifying step S120, a power cut-off control signal outputting step S130 and a power cutting-off step S140.

First, as the power cut-off function is selected by an interrupt command or an application program, the operating system performs the power cut-off command discriminating step S110 of the advanced power management function. The advanced power management function is started by calling a predetermined interrupt service routine from the BIOS portion 210. In the interrupt service routine, CPU 200 checks the input/output ports of microprocessor 270 to control the turning on or turning off of the power source. At that time, it is determined whether the microprocessor 270 is set at a waiting mode not to perform data transmission, data reception nor a control function of a load according to step S120. If microprocessor 270 is at a waiting mode, CPU 200 outputs a power cut-off command signal to the microprocessor 270 according to step S130. Microprocessor 270 detects the power cut-off command signal to perform the power cut-off operation according to step 140 as explained below with respect to FIG. 9.

Next, referring now to FIG. 9, when microprocessor 270 receives the power cut-off command signal from BIOS portion 210, at step 210, microprocessor 270 outputs the power cut-off signal, for example a low level signal, to the power control port PWR-CLR of a power control portion 260, at step S220. Then, microprocessor 270 scans the power output port of the power control portion 260 in order to confirm the power cut-off operation, at step S230. At that time, if the power output port is at a low level, for example 0V, it is determined that the power source is turned off and the process proceeds to step S240. On the contrary, if the power outputting port is at a high level, for example 5V, it is determined that the power source is turned on and the process returns to step S220. If the power source is determined to be turned on at step S230, microprocessor 270 again applies the power cut-off control signal to the power control port PWR-CLR, at step S220.

At step S240, when the power source is determined to be turned off, microprocessor 270 determines whether an adaptor 145 is connected to the power control portion 260. If adaptor 145 is determined to be connected to power control portion 260, microprocessor 270 performs a battery charging mode to force battery 140 to be charged at step S260. If it is determined that adaptor 145 is not connected to power control portion 260, microprocessor 270 performs a system ending mode at step S250 to cut off power from battery 140.

Accordingly, the invention comprises a power cut-off control portion including a system power cut-off service routine in a BIOS portion and an advanced power management function portion in a microprocessor, so that the operation of the power cut-off is accomplished without a waiting time taken in storing data and information at a system memory during cutting off of power to the operating system.

What is claimed is:

1. A computer with automatic power cut-off function comprising:

a basic input-output system (BIOS) portion for storing a program to control various input and outputs of a system, said BIOS further storing a power cut-off routine;

a central processing unit for performing data processing functions, wherein said central processing unit calls said power cut-off routine from said BIOS when an operating system of said computer has ended and forces said BIOS to generate a power cut-off command signal;

a power control portion for controlling power supply and cut-off of a power source to the system; and a microprocessor generating a power cut-off signal, in response to said power cut-off command signal, for enabling the power control portion to automatically cut off said power source to the system when said operating system program is ended.

2. The computer with automatic power cut-off function as set forth in claim 1, wherein said microprocessor checks for a power interrupting detecting signal output from said power control portion when said power control portion successfully cuts off said power source, said microprocessor supplying said power cut-off signal to said power control portion again when said microprocessor fails to detect said power interrupting detecting signal.

3. The computer with automatic power cut-off function as set forth in claim 2, wherein said microprocessor determines whether said power source is a power adaptor, said microprocessor performing a battery charging routine when it is determined that said power source is said power adaptor and performing a system ending mode when it is determined that said power source is not said power adaptor.

4. The computer with automatic power cut-off function as set forth in claim 1, wherein said power control portion comprises:
  a power selecting portion for selecting to receive power from one of two power sources;
  a twelve volt switching portion enabled by a twelve power control portion to outputting 12 volts to certain system loads;
  a power down control portion;
  a microprocessor power control portion for supplying a power voltage to said microprocessor:
    a 3.3 volt switching power source for outputting 3.3 volts to predetermined system loads;
    a 5 volt switching power source or outputting 5 volts to other predetermined system loads;
    an overload detecting portion for detecting when either of the 3.3V switching power source and the 5V switching power source are in an overload state; and
    a low voltage interrupting portion for generating a low voltage control signal for output to said power down control portion for controlling said power down control portion to interrupt voltage supply to said system loads by said 3.3 volt switching power source, said 5 volt switching power source and said twelve volt switching portion, when the power output by the selected one of said two power source is below a predetermined power level.

5. The computer with automatic power cut-off function as set forth in claim 4, when said overload detecting portion detects said overload state, said overload detecting portion applies a power cut-off control signal to said power down control portion for controlling said power down control portion to interrupt voltage supply to said system loads by said 3.3 volt switching power source, said 5 volt switching power source and said twelve volt switching portion.

6. The computer with automatic power cut-off function as set forth in claim 4, wherein said power down control portion receives a low logic level control signal through a control port from said microprocessor in response to said power cut-off command signal from said BIOS.

7. A power cut-off control method of a computer having a power cut-off function automatically started when an operating system program has ended, said computer including a power cut-off routine stored in a BIOS memory, said method comprising steps of:
  outputting a power cut-off command from said BIOS memory to a microprocessor when said operating system program has ended;
  generating a power cut-off signal in response to said power cut-off command and outputting said power cut-off signal from said microprocessor to a power controller; and
  automatically cutting off power from a power source of said computer when said power controller receives said power cut-off signal output from said microprocessor.

8. The method as set forth in claim 7, said step of generating a power cut-off signal further comprising steps of:
  determining, by said microprocessor, whether said power from said power source is cut off; and
  regenerating said power cut-off signal when it is determined that power from said power source is not cut off.

9. The method as set forth in claim 7, said step of generating a power cut-off further comprising steps of:
  determining, by said microprocessor, whether said power from said power source is cut off;
  determining whether said power source is a direct-current adapter when it is determined that power from said power source is cut off;
  performing a battery charging routine when it is determined that said power source is said direct-current adapter; and
  performing a system ending mode when it is determined that said power source is not said direct-current adaptor.

10. A computer with automatic power cut-off function, comprising:
  a basic input-output system (BIOS) portion having a power cut-off routine stored therein;
  a central processing unit calling said power cut-off routine from said BIOS and forcing said BIOS to generated a power cut-off command signal, when an operating system of said computer has ended;
  a power control portion controlling connection of predetermined portions of said computer to a power supply from a power source and cutting off select ones of said predetermined portions of said computer from said power supply from said power source; and
  a microprocessor generating a power cut-off signal, in response to said power cut-off command signal, for enabling the power control portion to automatically cut off select ones of said predetermined portions of said computer from said power supply when said operating system program is ended.

11. The computer as set forth in claim 10, wherein said microprocessor checks for a power interrupting detecting signal output from said power control portion when said power control portion successfully cuts off said power source, said microprocessor supplying said power cut-off signal to said power control portion again when said microprocessor fails to detect said power interrupting detecting signal.

12. The computer as set forth in claim 10, wherein said power control portion comprises:
  a power selecting portion for selecting to receive power from one of two power sources;
  a twelve volt switching portion enabled by a twelve power control portion to outputting 12 volts to certain system loads;
  a power down control portion;
  a microprocessor power control portion for supplying a power voltage to said microprocessor:
    a 3.3 volt switching power source for outputting 3.3 volts to predetermined system loads;
    a 5 volt switching power source or outputting 5 volts to other predetermined system loads;
    an overload detecting portion for detecting when either of the 3.3V switching power source and the 5V switching power source are in an overload state; and
    a low voltage interrupting portion for generating a low voltage control signal for output to said power down control portion for controlling said power down control portion to interrupt voltage supply to said system loads by said 3.3 volt switching power source, said 5 volt switching power source and said twelve volt switching portion, when the power output by the selected one of said two power source is below a predetermined power level.

13. The computer as set forth in claim 12, wherein said select ones of said predetermined portions of said computer include said 3.3 volt switching power source, said 5 volt switching power source and said twelve volt switching portion.

14. The computer as set forth in claim 12, wherein said microprocessor determines whether the selected one of said two power source is a power adaptor, said microprocessor performing a battery charging routine, when it is determined that the selected one of said two power source is said power adaptor, and performing a system ending mode by generating said low voltage control signal for output to said power down control portion for controlling said power down control portion to interrupt voltage supply to said system loads by said 3.3 volt switching power source, said 5 volt switching power source and said twelve volt switching portion, when it is determined that said selected one of said two power source is not said power adaptor.

15. The computer as set forth in claim 12, when said overload detecting portion detects said overload state, said overload detecting portion applies a power cut-off control signal to said power down control portion for controlling said power down control portion to interrupt voltage supply to said system loads by said 3.3 volt switching power source, said 5 volt switching power source and said twelve volt switching portion.

16. The computer as set forth in claim 12, wherein said power down control portion receives a low logic level control signal through a control port from said microprocessor in response to said power cut-off command signal from said BIOS.

* * * * *